Dec. 20, 1927.                    J. A. COZZONE                    1,653,036
                                DOUGH FORMING MACHINE
                          Filed April 1, 1926            2 Sheets-Sheet 1
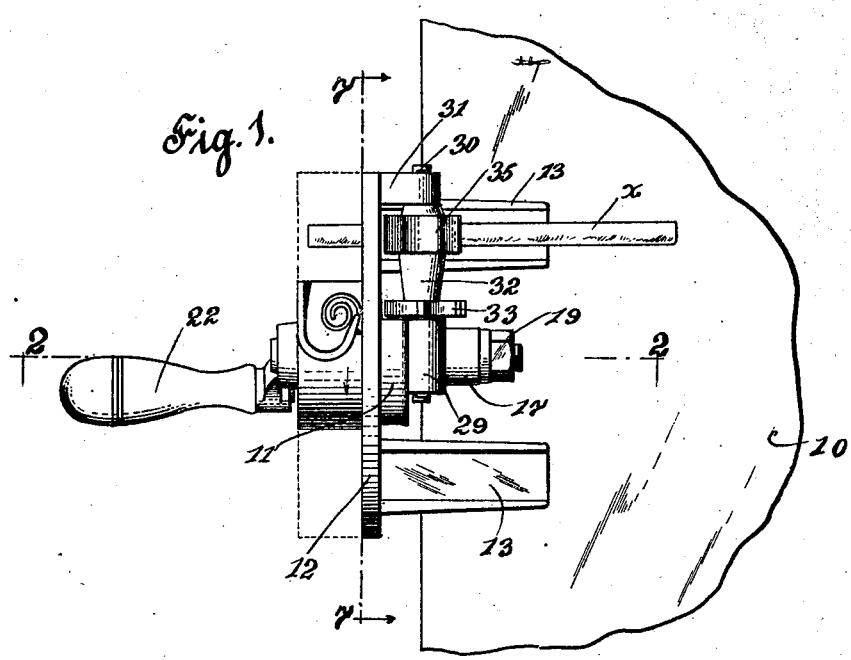
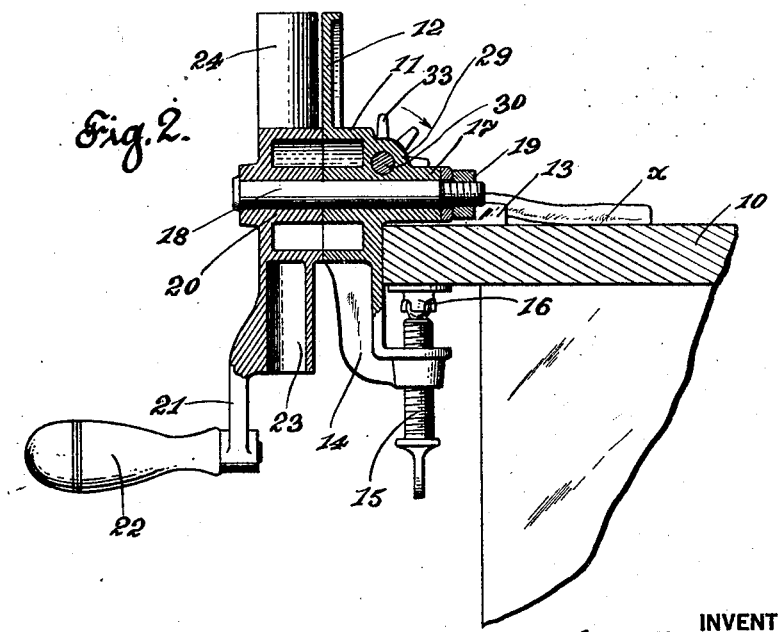
INVENTOR
John A. Cozzone
BY
Fred C. Fischer
ATTORNEY

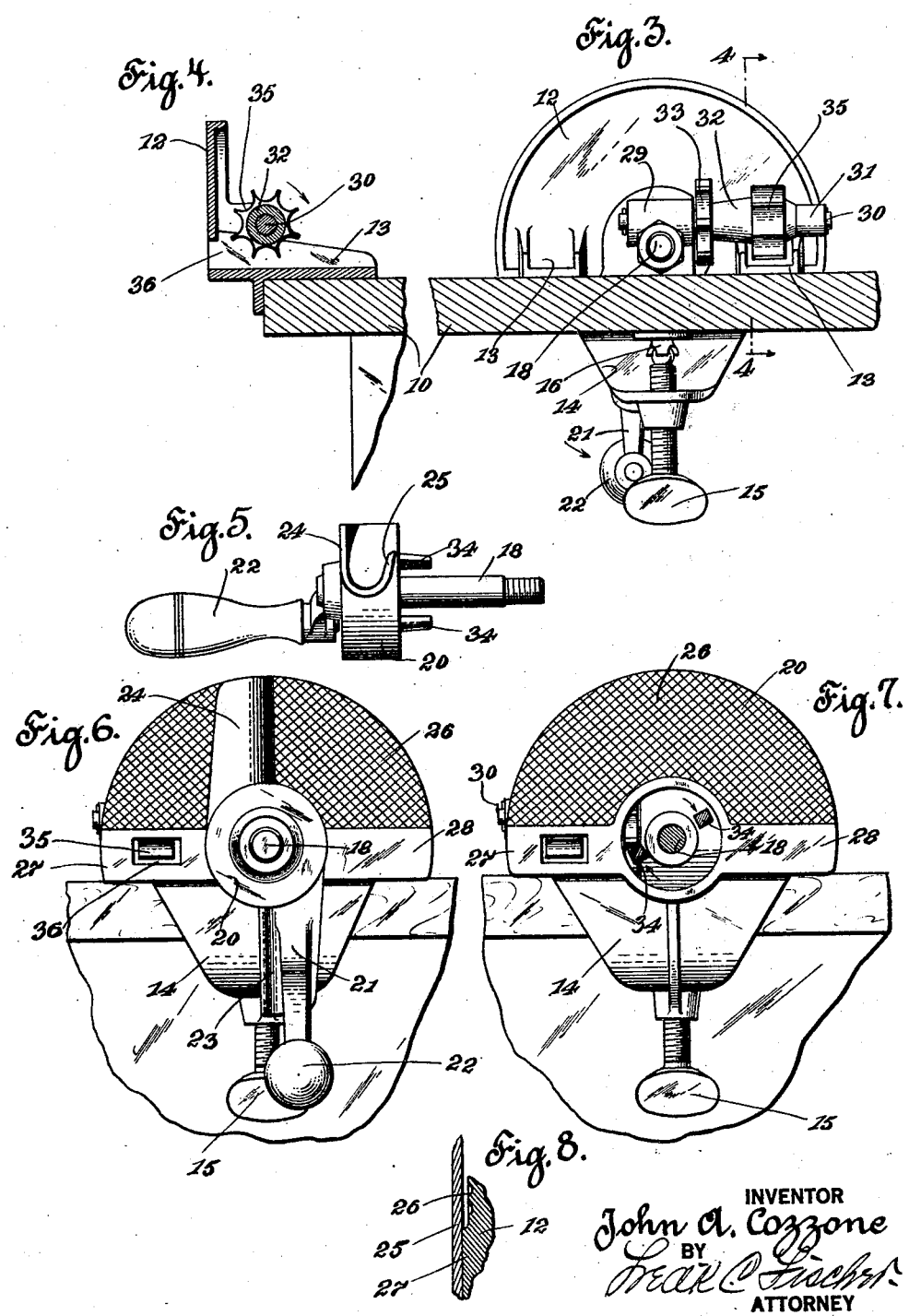

Patented Dec. 20, 1927.

1,653,036

UNITED STATES PATENT OFFICE.

JOHN A. COZZONE, OF NEWARK, NEW JERSEY.

DOUGH-FORMING MACHINE.

Application filed April 1, 1926. Serial No. 98,947.

This invention relates to machines for forming dough or like plastic material into fanciful shapes and has as one of its objects to provide a mechanism, simple, strong and compact, adapted for kitchen operation, and by which an alimentary paste, in the form of a roll, is divided into suitable lengths, rolled flat, corrugated on the outer side and curled into a spiral shell.

A further feature is in the provision of a dough forming machine in which the main movable elements are of unitary construction, so inter-related as to avoid possibility of relative slipping and becoming out of time, with consequent loss or inferior production of articles.

Another aim is to produce a mechanism extremely simple and easy to operate and which can be produced at a moderate cost, well within the range of other kitchen utensils, facilitating the production of food in an attractive form.

Other material objects and advantages will hereinafter appear and the construction illustrated in the accompanying drawings, forming a component hereof, and in which:—

Figure 1 is a top plan view of an embodiment of the apparatus, illustrating its application.

Figure 2 is a transverse sectional view of the same taken on line 2—2 of Fig. 1.

Figure 3 is a rear end elevational view of the same.

Figure 4 is a fragmentary transverse sectional view taken on line 4—4 of Fig. 3.

Figure 5 is a side elevational view of the manually operable actuating member as dismounted from the main body.

Figure 6 is a front elevational view of the apparatus as fully assembled.

Figure 7 is a sectional view taken on line 7—7 of Fig. 1.

Figure 8 is a small fragmentary sectional view showing the relation of parts where the cutting and corrugating is performed.

The device is adapted to be detachably engaged on any level surfaced support, as the table 10, and is composed of a frame body 11 having an upright segmental flanged face 12 of more than a half circle, the same having a re-enforcing rib at the back of its periphery.

A pair of channelled arms 13 reach rearwardly to rest upon the surface of the support 10 and extending downwardly from the body, at the center thereof is a bracket 14, turned rearwardly at a right angle to reach below the support and provided with a winged clamp screw 15, carrying at its point a self adjusting clamp disc 16 adapted to impinge on the under surface of the support and hold the body rigidly in adjustment.

The body 11 may be recessed in order to reduce the weight and is provided with a rearwardly extending boss 17, through which passes a spindle 18 having a reduced rear end threaded to receive a washer and nut 19 by which the spindle is held in operative relation.

Mounted rigidly on the front portion of the spindle is a hub 20 formed with a lever arm 21 having a manually operable handle 22 and at the back of the arm is a channelled member 23.

Extending oppositely from the hub 20 is a combined cutter and roller 24 of substantially U-shaped cross section, the inner, shorter element 25 being spaced adjacent the corrugated face 26 of the body, to wipe the outstanding faces 27 and 28 thereof.

A transverse boss 29 on the body 11 provides a bearing for one end of a spindle 30, its other end engaging in a boss 31 extending rearwardly from the flange 12, and mounted on the spindle is a sleeve 32 filling the space between the bosses.

Formed integrally on the sleeve is a sprocket wheel 33, adjacent the boss 29 and engaging the teeth of the sprocket, one at a time, to communicate motion thereto, are a pair of studs 34 extending rigidly from the back of the hub 20.

At the other end of the spindle 30 is an integral fluted roll 35, registering between the raised side elements of one of the channelled brackets 13 and slightly above its upper surface, directly in alinement with an opening 36 in the thickened element 27 of the body flange.

In operation a roll of dough, indicated at X in Figs. 1 and 2 is laid upon the table, a portion reaching over the channel bracket 13 to be engaged by the fluted feed roll 35 when the sleeve is rotated by the sprocket 33 and studs 34 upon turning the handle 22.

A suitable length of the roll is thus intermittently expelled outward through the opening 36, sheared by the short edge 25 of the cutter and carried forcibly upward against the corrugated face 26 of the body flange whereby the cut off portion of the dough is flattened and its outer face imprinted or embossed with the design on the flange, eventually becoming rolled in the form of a spiral, as clearly shown in Fig. 1.

Should the dough become loosened from the element 24 prematurely it will drop into the channel 23, in either case being deposited outwardly of the apparatus in a finished condition.

It is to be noted that the feed elements 32, 33 and 35 are unitary and also the combined cutting, shaping and power transmitting elements, so that the parts of device are maintained in accurately timed relation, two of the completed spiral products being obtained at each turn of the handle.

Although I have described my improvements with considerable detail and with respect to certain particular forms of my invention, I do not desire to be limited to such details since many changes and modifications may well be made without departing from the spirit and scope of my invention in its broadest aspect.

Having thus described my invention, what I claim as new and desire to secure by Letters Patent, is:—

1. A forming machine for plastic material comprising a frame engageable with a support, an upright segmental plate on said frame having a corrugated face and containing an opening, a spindle journalled in said frame, a hub fixed on the spindle, said hub having a hand actuable lever, and a combined cutter and roller carried by said hub to shear material passed through the mentioned opening and emboss and curl it by passage over said corrugated plate.

2. A forming machine for plastic material comprising a portable frame having an upright plate provided with corrugations on the upper portion of its front surface and a level thickened face therebelow containing an opening, means to expel material intermittently through the opening, a hub rotatably mounted in said frame, means for actuating said hub, and means carried by said hub to sever a strip of material expelled through the mentioned opening, said means also pressing the severed portion and rolling it against the face of said plate to emboss and curl the material.

3. A plastic mass forming machine comprising a plate having a relatively small level surface and a main depressed surface provided with a matted exterior, a channel extending rearwardly from said plate in register with an opening therein, an arm of U-shaped cross-section journalled in said plate to sweep the face thereof, said arm having a part to act in conjunction with the opening as a shear and another part to curl material against the plate, means to actuate said arm, and means over said channel to intermittently feed material therethrough into position to be acted upon by said shear.

4. A plastic mass forming machine comprising a plate having a relatively small level surface and a main depressed surface provided with a matted exterior, a channel extending rearwardly from said plate in register with an opening therein, an arm of U-shaped cross-section journalled in said plate to sweep the face thereof, to cut, roll, emboss and curl portions of material passed through the opening, a feed roller disposed over said channel, and means combined with said arm to impart motion periodically to said roller.

5. A plastic mass forming machine comprising a plate having a relatively small level surface and a main depressed portion provided with a matted surface, a channel extending rearwardly from said plate in register with an opening therein, an arm adapted to sweep circularly over said plate to cut, roll, emboss and curl material delivered through the opening therein, means to manually actuate said arm, a spindle rotatable transversely at the rear of said plate, a sleeve on said spindle, a feed roller and sprocket integral with the sleeve, said feed roller being disposed over the channel, and studs combined with said arm to operatively engage said sprocket intermittently.

6. A plastic mass forming machine comprising a frame including an upright plate, a guide channel leading to an opening in said plate, means for feeding material along said channel through said plate, hand operated means for shearing, rolling and curling material discharged through the plate opening, and intermittent drive connections between said hand operated means and said feed means.

7. A plastic mass forming machine comprising a frame having an upright segmental plate containing an opening, means for feeding material through the opening, and means on the opposite side of said plate to cut, roll and curl portions of the material so fed.

8. A plastic mass forming machine comprising a frame having an upright segmental plate provided with a mat face, means to feed material through an opening in said plate intermittently, means on the face of said plate to progressively separate, flatten, emboss and curl portions of the material as fed, and positively driving connections from the last named means to said feeding means whereby a definite timed relation is secured.

This specification signed and witnessed this 26th day of March, 1926.

JOHN A. COZZONE.